United States Patent
Faller et al.

(10) Patent No.: US 8,671,823 B2
(45) Date of Patent: Mar. 18, 2014

(54) PNEUMATIC BRAKE SERVO

(75) Inventors: Jürgen Faller, Kahl (DE); Klaus Lind, Wölfersheim (DE)

(73) Assignee: Continental Teves AG & Co. oHG (DE)

(*) Notice: Subject to any disclaimer, the term of this patent is extended or adjusted under 35 U.S.C. 154(b) by 1070 days.

(21) Appl. No.: 12/297,266

(22) PCT Filed: Apr. 19, 2007

(86) PCT No.: PCT/EP2007/053839
§ 371 (c)(1),
(2), (4) Date: Mar. 11, 2009

(87) PCT Pub. No.: WO2007/122176
PCT Pub. Date: Nov. 1, 2007

(65) Prior Publication Data
US 2009/0199704 A1    Aug. 13, 2009

(30) Foreign Application Priority Data

Apr. 25, 2006 (DE) .......................... 10 2006 019 039
Jun. 30, 2006 (DE) .......................... 10 2006 030 332
Jul. 20, 2006 (DE) .......................... 10 2006 033 534

(51) Int. Cl.
*F15B 9/10* (2006.01)
*B60T 13/575* (2006.01)

(52) U.S. Cl.
USPC ........................................................ 91/369.2

(58) Field of Classification Search
USPC ........................................................ 91/369.2
See application file for complete search history.

(56) References Cited

U.S. PATENT DOCUMENTS

| 4,350,076 A | 9/1982 | Thiel |
| 4,354,353 A * | 10/1982 | Laue ........................... 91/369.2 |
| 5,263,398 A | 11/1993 | Kobayashi et al. |
| 5,293,808 A | 3/1994 | Rueffer et al. |
| 5,493,948 A | 2/1996 | Gautler et al. |
| 5,546,846 A | 8/1996 | Bauer |
| 7,032,496 B2 | 4/2006 | Schramm et al. |
| 2004/0094027 A1* | 5/2004 | Bacardit et al. ............. 91/369.2 |

FOREIGN PATENT DOCUMENTS

| DE | 29 18 908 C2 | 12/1980 |
| DE | 39 39 499 A1 | 6/1991 |
| DE | 39 41 604 A1 | 6/1991 |
| DE | 42 27 879 A1 | 2/1994 |
| DE | 693 03 018 T2 | 10/1996 |
| DE | 101 13 292 A1 | 9/2002 |
| DE | 102 44 002 A1 | 4/2004 |
| EP | 1 400 425 A1 | 3/2004 |

* cited by examiner

Primary Examiner — F. Daniel Lopez
(74) Attorney, Agent, or Firm — RatnerPrestia

(57) ABSTRACT

A pneumatic brake servo which can be acted on by a pneumatic differential pressure is described. The brake servo includes an actuable input member comprising a valve piston, an output member for acting on a master brake cylinder, and a control valve which is arranged in a control housing and which can be actuated by the valve piston for controlling the differential pressure. An elastic reaction element is arranged in a control housing recess and against which the output member bears. The input member acts with an input effective area A1 on the reaction element, and the output member acts with an output effective area A2 on the reaction element. The ratio of output effective area A2 to input effective area A1 determines the force boost ratio of the brake servo.
Means are provided for adjusting the output effective area A2 in the assembled brake servo.

24 Claims, 6 Drawing Sheets

PNEUMATIC BRAKE SERVO

CROSS REFERENCE TO RELATED APPLICATIONS

This application is the U.S. national phase application of PCT International Application No. PCT/EP2007/053839, filed Apr. 19, 2007, which claims priority to German Patent Application No. DE102006019039.4, filed Apr. 25, 2006, German Patent Application No. DE102006030332.6, filed Jun. 30, 2006, and German Patent Application No. DE102006033534.1, filed Jul. 20, 2006, the contents of such applications being incorporated by reference herein in their entirety.

BACKGROUND OF THE INVENTION

1. Field of the Invention

The invention relates to a pneumatic brake servo for motor vehicles.

2. Description of the Related Art

A generic brake servo is known for example from DE 42 27 879 A1.

The automobile industry makes high demands with regard to the brake servo characteristic curve, that is to say the tolerances of the force boost ratio which result from the tolerances of the components and of the springs and from the shore hardness of the reaction element and from friction, must be as low as possible. Known brake servos, however, do not meet said high demands.

SUMMARY OF THE INVENTION

It is an object of the invention to provide a generic brake servo having very low or precise tolerances of the boost ratio.

The object is achieved in that means are provided for adjusting the output effective area in the assembled brake servo. In this way, the tolerances of the components and of the springs and the different shore hardnesses of the reaction element and the friction can be compensated, and the boost of the brake servo can be adjusted according to the demands of the automobile industry, and the required tolerances can be adhered to. A further advantage is provided in that the adjustment or alteration of the output effective area likewise permits a change in the force boost ratio of the brake servo.

The means for adjusting the output effective area preferably permit a change in a chamber volume of the reaction element, with the chamber volume of the reaction element being determined by the output member and directly or indirectly by the control housing recess. Utilization is therefore made of the fact that the flow properties of the reaction element change with a variation in the chamber volume, since the reaction element does not fill the space uniformly.

In one advantageous refinement of the invention, the output element has, on a side facing toward the reaction element, a threaded bore into which an adjusting element can be screwed, with the adjusting element permitting an adjustment of the output effective area. The output element is therefore formed in a plurality of parts and may be provided as a pre-assembled unit. This does not increase the assembly expenditure of the brake servo.

For the simple adjustment of the output effective area, the output member has a passage bore which opens out into the threaded bore and through which an adjusting tool for rotating the adjusting element can be inserted.

A further advantageous embodiment of the invention provides that the adjusting element is formed in one piece and has a threaded section and a disk-shaped section, with the output member having, on the side facing toward the reaction member, a recess with a diameter, with the disk-shaped section of the adjusting element being arranged so as to be guided in said recess. The adjusting element is hereby fixed in the output member, and cannot fall out.

According to a further advantageous refinement of the invention, the adjusting element is formed in two parts and comprises a set screw and a separate disk, with the output element having, on the side facing toward the reaction member, a recess with a diameter, in which recess the disk is arranged. In this way, the adjusting element may be provided in a cost-effective manner from standardized individual parts.

For simple production of the output element, the diameter of the recess of the output element is greater than a diameter of the threaded bore of the output member.

To prevent rotation of the adjusting element during operation of the brake servo, according to one advantageous refinement of the invention, means for rotationally locking the adjusting element are provided.

According to advantageous refinements of the invention, the means for rotationally locking the adjusting element are provided either on the threaded bore of the output member or on the threaded section of the adjusting element. In other words, the rotational locking may be provided in the form of a locking thread.

A further advantageous embodiment of the invention provides that the adjusting element has a roughened surface on an end side facing toward the reaction element. Here, it is advantageous that the end side of the adjusting element is easily accessible for machining.

Furthermore, a further advantageous embodiment provides that the adjusting element has recesses on an end side facing toward the reaction member, which recesses are preferably formed in the manner of grooves and arranged so as to be distributed uniformly on the end side. The recesses are simple and cost-effective to produce.

The output member is preferably formed in two parts with a first and a second component, with the first component having the head flange and a first cylindrical section which adjoins said head flange, and the second component having a second cylindrical section with a first spherical end which faces away from the first component, and the cylindrical sections can preferably be captively connected to one another. It is thereby possible for the so-called functional dimension of the brake servo to be adjusted in a simpler and more cost-effective manner. Furthermore, it is thereby possible to use the first component for different embodiments of the brake servo and to adapt only the second component to the dimensions of the brake servo.

According to one advantageous embodiment, the second component has, on its second end, a pot-shaped section, by means of which the second component can be captively connected to the first component.

A further advantageous embodiment provides that the second component has, on its second end, a journal which, for the captive connection to the first component, projects into a passage bore.

The captive connection is preferably provided by means of a knurl on the first component or on the second component, or by means of a threaded connection between the first component and the second component.

In order to save on a guide plate, according to one advantageous refinement of the invention, the head flange has, at the circumference, an encircling collar for guiding the output element in the control housing recess.

Furthermore, a method according to aspects of the invention for adjusting the force boost ratio of a brake servo provides that the adjustment of the output effective area takes place in an assembled state of the brake servo. A cumbersome exchange of components is thereby dispensed with.

These and other aspects of the invention are illustrated in detail by way of the embodiments and are described with respect to the embodiments in the following, making reference to the Figures.

BRIEF DESCRIPTION OF THE DRAWINGS

Further features and advantages of the invention can be gathered from the following description of exemplary embodiments on the basis of the drawing, in which, in each case in highly schematic form and in section.

DETAILED DESCRIPTION OF THE PREFERRED EMBODIMENTS

Figure 1:
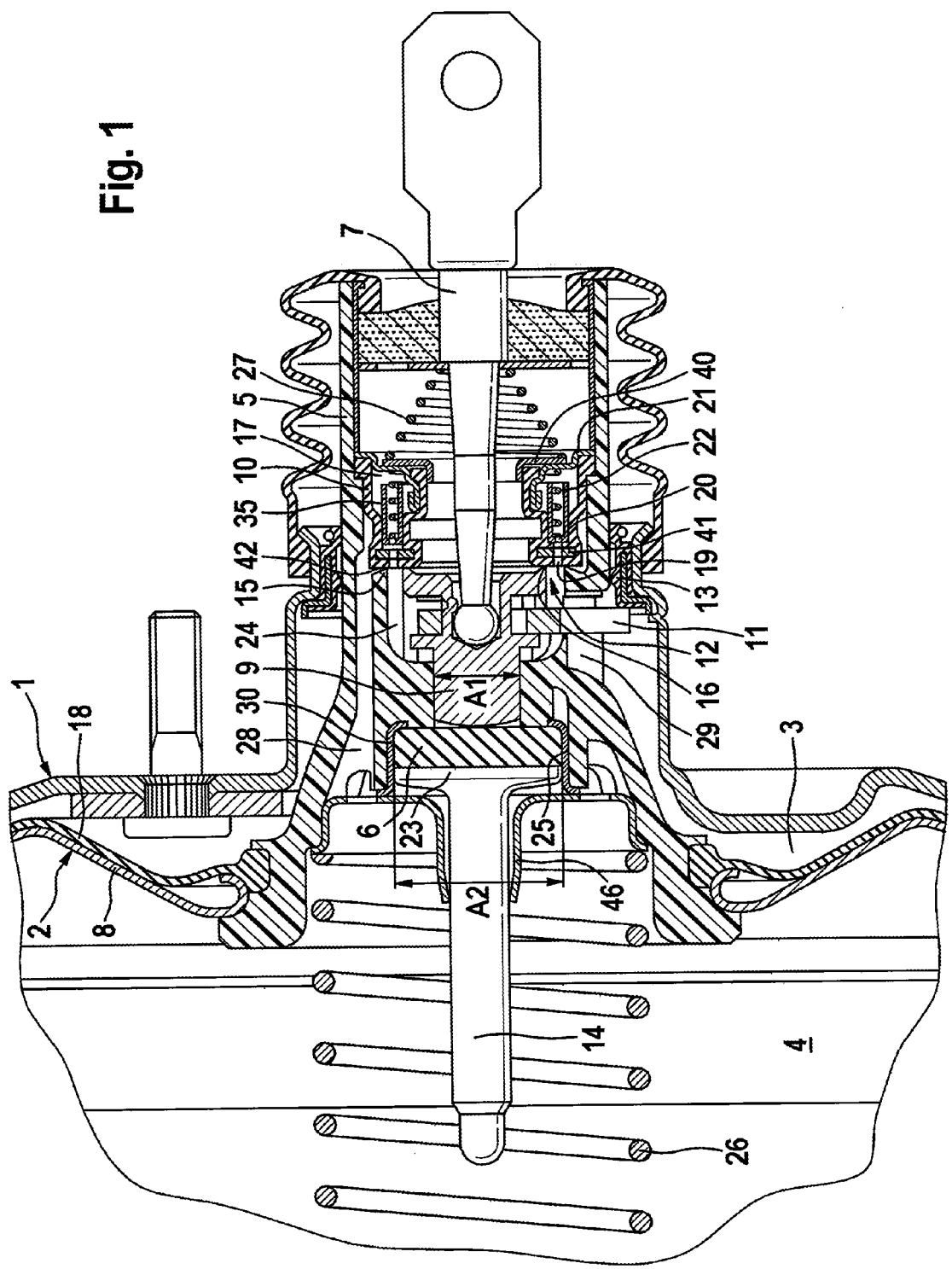
FIG. 1 shows a partial view of a known brake servo in longitudinal section.

The merely schematically indicated servo housing 1 of a known pneumatic brake servo, shown in FIG. 1, of a motor vehicle brake system is divided by an axially movable wall 2 into a working chamber 3 and a vacuum chamber 4. The axially movable wall 2 is composed of a diaphragm plate 8, which is deep-drawn from a metal sheet, and a flexible diaphragm 18 which bears against said diaphragm plate 8 and which, in a manner not illustrated in any more detail, forms a diaphragm as a seal between the outer circumference of the diaphragm plate 8 and the servo housing 1.

A control valve 12 which can be actuated by an input member 7 is accommodated in a control housing 5 which is guided in a sealed fashion in the servo housing 1 and which supports the movable wall 2, and said control valve 12 is composed of a first sealing seat 15, which is formed on the control housing 5, a second sealing seat 16, which is formed on a valve piston 9 which is connected to the input member 7, and a valve body 10 which interacts with the two sealing seats 15, 16 and which is pressed against the valve seats 15, 16 by means of a valve spring 22 which is supported on a retaining ring 21. The working chamber 3 can be connected to the vacuum chamber 4 by means of a duct 28 which runs laterally in the control housing 5. The input member 7 is connected to a brake pedal (not illustrated.

The brake force is transmitted by means of a resiliently elastic reaction element 6, which bears at the end side against the control housing 5, and an output member 14, which has a head flange 23, to an actuating piston of a master cylinder (not illustrated) of the brake system, which master cylinder is accommodated at the vacuum-side end of the brake servo. The input force which is introduced at the input member 7 is transmitted to the reaction element 6 by means of the valve piston 9.

The reaction element 6 is disk-shaped and is formed from plastic or rubber material, and under pressure loading behaves, according to the principles of hydrostatics, as an incompressible fluid. That is to say said reaction element functions, in a sense, as a summing unit between the foot forces introduced by the valve piston 9, the boost force introduced via the control housing 1, and the brake reaction forces which are to be transmitted back to the vehicle driver via the output member 14. Accordingly, in all brake actuation positions, there is force equilibrium at the reaction element 6. A chamber volume of the reaction element 6 is, as can be seen, determined by a control housing recess 25, or an annular element 30 which is arranged therein or an annular disk 31 illustrated in FIG. 2, and the output member 14. The arrangement of the annular element 30 is not strictly necessary.

A restoring spring 26 which is illustrated schematically in the drawing and which is supported on the vacuum-side end wall of the servo housing 1 on a flange (not shown) holds the movable wall 2 in the starting position shown. Furthermore, the restoring spring 26 is supported on a guide plate 46 which bears against or is fastened to the control housing 5 and which serves firstly to support the restoring spring 26 and secondly to guide the output member 14. Furthermore, a return spring 27 is provided which is arranged between the input member 7 and a support ring 40 which bears against the retaining ring 21 and which secures the valve body 10 on the retaining ring 21, and the force of which return spring 27 provides a preload of the valve body 9 or of its valve seat 16 with respect to the valve body 10.

To be able to connect the working chamber 3 to the atmosphere during the actuation of the control valve 12, an approximately radially running duct 29 is finally formed in the control housing 5. The returning movement of the valve piston 9 at the end of a braking process is limited here by a transverse member 11 which, in the released position of the vacuum brake servo shown in the drawing, bears against a sliding sealing ring 13 which guides the control housing 5 in a sealed fashion in the servo housing 1.

The valve body 10 has an annular sealing surface 42 which interacts with the two sealing seats 15, 16 and which is stiffened by means of a metallic stiffening disk 41 and which is provided with a plurality of axial passages 19.

A pneumatic space 17 is delimited in the control housing 5. An annular stiffening element 35 which is U-shaped in cross section is arranged in the valve body 10, against which stiffening element 35 the valve spring 22 is supported and which stiffening element 35 has a plurality of openings 20 which are formed opposite the passages 19 of the valve body 10. The flow ducts (not shown in any more detail) which are formed by the passages 19 and the openings 20 connect the pneumatic space 17 to an annular space 24 which is delimited by the sealing seats 15, 16 and in which the abovementioned pneumatic duct 29 opens out, such that the pneumatic space 17, which is formed on that side of the valve body 10 which faces away from the sealing surface 42, is permanently connected to the working chamber 3, and a pressure equalization takes place at the valve body 10.

It can also be seen that the input member 7, or the valve piston 9 which is connected to the input member 7, acts with an input effective area A1, and the output member 14 acts with an output effective area A2, on the reaction element 6, and the ratio of output effective area A2 to input effective area A1 determines the force boost ratio of the brake servo. However, the tolerances of the components and of the springs and the shore hardness of the reaction element 6 and friction result in tolerances in the force boost ratio, which do not meet modern-day requirements. It is therefore necessary in a known brake servo as per FIG. 1 to exchange different components in order to be able to adhere to a very narrow tolerance band of the force boost ratio as is required nowadays in the automobile industry.

The mode of operation and the basic design of the first exemplary embodiment of the invention described below do not differ from the basic design of the known brake servo described as per FIG. 1, such that below, only those parts which relate to the invention are illustrated and described. Here, identical components are provided with the same reference signs and are not described again below. Furthermore, the described invention may be used in brake servos of single or tandem design.

Figure 2:
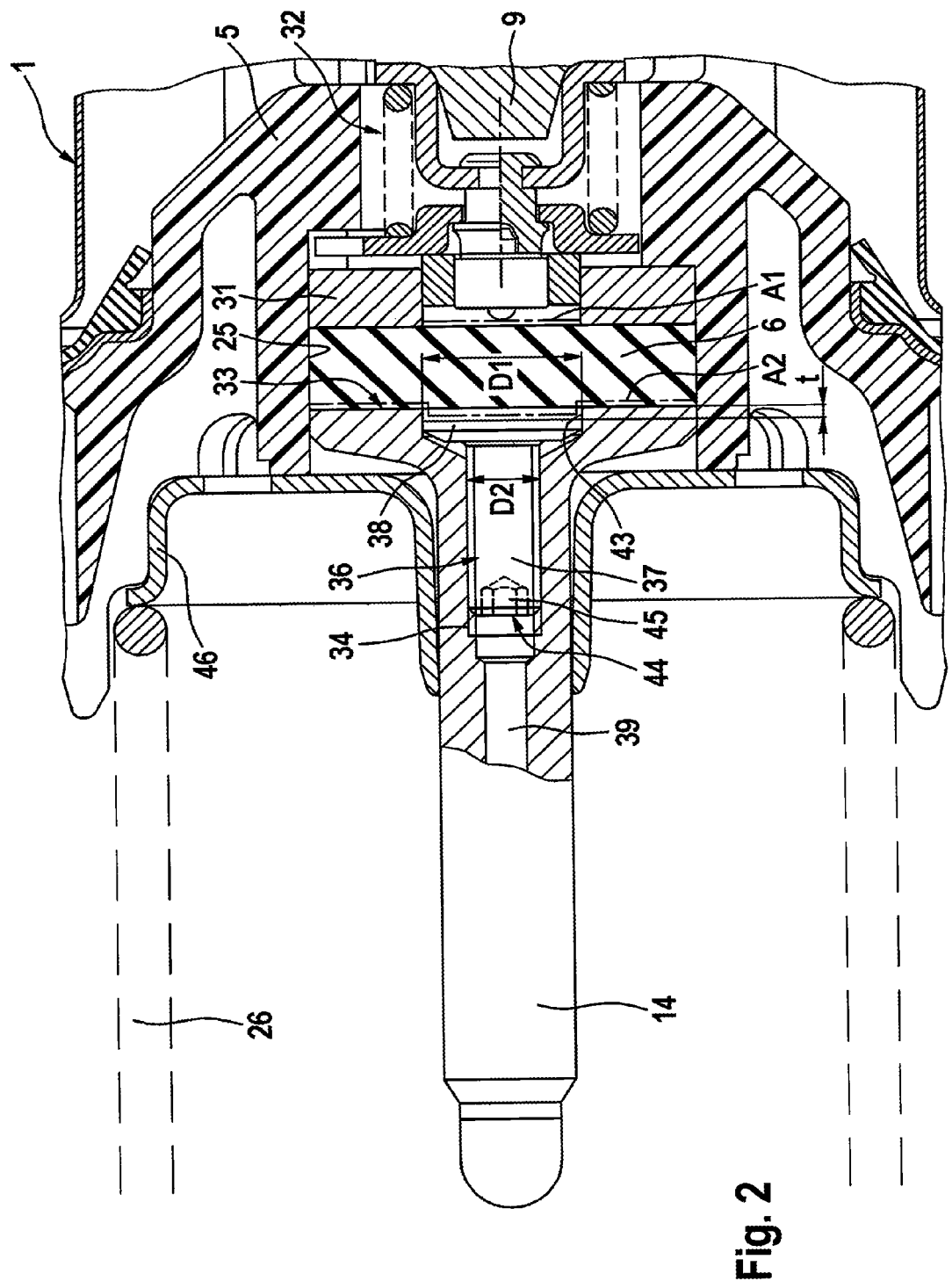
FIG. 2 shows a detail of a first exemplary embodiment of a brake servo according to aspects of the invention, in longitudinal section.

As can be seen from FIG. 2, a device 32 for varying the input effective area A1 for a predefined input force is provided between the valve piston 9 and the reaction element 6, by means of which device 32 the valve piston 9 is connected in a force-transmitting fashion to the reaction element 6. Such a device 32 for varying the input effective area A1 is already known from a prior application by the applicant, DE 101 44 619 A1, and is not essential to the invention, and therefore a detailed description is omitted. The input effective area A1 in the embodiment of the invention which is shown is formed by the device 32, though may also, as in FIG. 1, be formed directly on the valve piston 9 or on a pressure piece which is provided between the valve piston 9 and the reaction element 6.

FIG. 2 shows a partial view of an exemplary embodiment of a pneumatic brake servo according to aspects of the invention of a motor vehicle brake system, in longitudinal section, with the partial view showing only those parts of the brake servo which are essential to the invention.

The automobile industry makes high demands with regard to the brake servo characteristic curve, that is to say the tolerances of the force boost ratio which result from the tolerances of the components and of the springs and from the shore hardness of the reaction element and from friction must be as precise as possible, that is to say the tolerance band must be as narrow as possible.

As can be seen, the output member 14 is formed in a plurality of parts and has, on a side 33 facing toward the reaction element 6, a threaded bore 34 into which an adjusting element 36 is screwed.

The adjusting element 36, as illustrated in FIG. 2, may either be formed in one piece and have a threaded section 37 and a disk-shaped section 38, or formed in two parts with a set screw and a separate disk. The output effective area A2 is defined by the area with which the reaction element 6 bears against the output member 14 and the adjusting element 36.

To adjust the chamber volume of the reaction element 6 and therefore to adjust the output effective area A2, the output member 14 has a passage bore 39 which opens out into the threaded bore 34 and through which an adjusting tool for rotating the adjusting element 36 can be inserted. For this purpose, the adjusting element 36 has, on a side 44 facing away from the reaction element 6, for example an internal hexagon 45.

It can also be seen from FIG. 2 that the output member 14 has, on the side 33 facing toward the reaction element 6, a recess 43 with a diameter D1, with the disk-shaped section 38 or the separate disk of the adjusting element 36 being arranged so as to be guided in said recess 43. The diameter D1 of the recess 43 is greater than a diameter D2 of the threaded bore 34, in order to facilitate the production of the output member 14.

By adjusting the output effective area A2, the tolerances of the components and of the springs and the different shore hardnesses of the reaction element 6 and the friction can be compensated, and the boost of the brake servo can be precisely adjusted according to the demands of the automobile industry. It is therefore possible firstly for the required tolerances to be adhered to without high costs and in a simple manner, though it is secondly also possible for the force boost ratio of the brake servo to be varied by altering the output effective area A2.

The adjustment of the output effective area A2 takes place by connecting the brake servo to a vacuum source (not shown), such that a certain operating pressure prevails in the servo housing 1. Furthermore, the brake servo is acted on with a certain input force $F_E$, for example 200N. As a result of the applied vacuum and said influences, a certain output force $F_A$ is generated, and in the reaction element 6, a force-relevant specific pressure is set appropriately to the prevailing forces.

During assembly, the adjusting element 36 is screwed with a certain depth t into the output member 14. By rotating the adjusting element 36, the chamber volume of the reaction element 6 is varied. The flow properties of the reaction element 6 vary with a change in chamber volume, since the reaction element 6 does not fill the space uniformly. A change in the output effective area A2 is thereby obtained.

Figure 3:
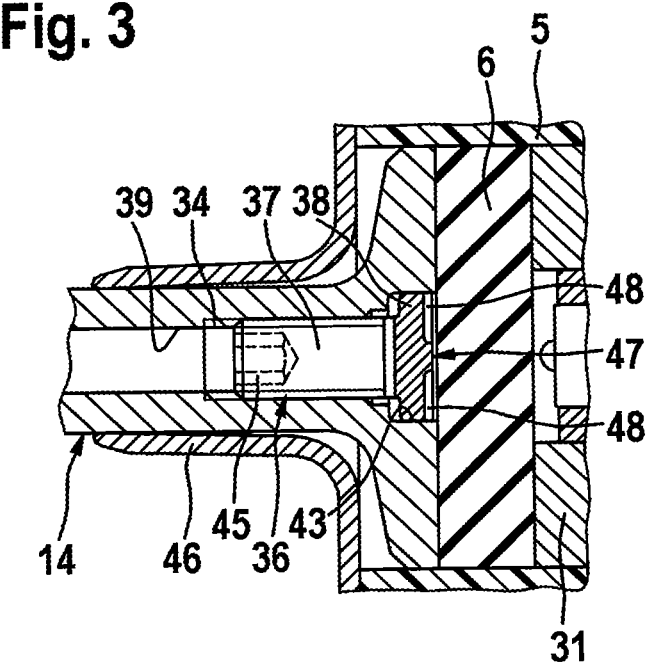
FIG. 3 shows a detail of a second exemplary embodiment of a brake servo according to aspects of the invention, in longitudinal section.
Figure 4:
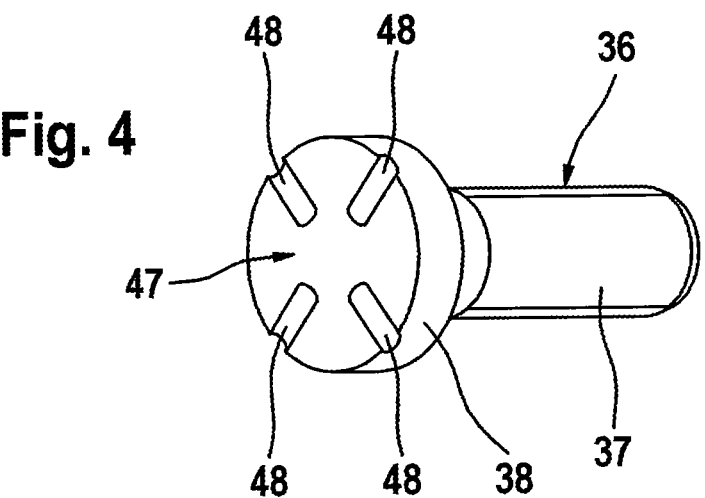
FIG. 4 shows an adjusting element of the second exemplary embodiment as per FIG. 3, in a three-dimensional illustration.

FIG. 3 and FIG. 4 show a second exemplary embodiment of a brake servo according to aspects of the invention, with merely a detail of the brake servo being illustrated in longitudinal section in FIG. 3, and FIG. 4 showing an adjusting element of said embodiment in a three-dimensional illustration. The second exemplary embodiment differs from the first exemplary embodiment in the configuration of the adjusting element 36, and therefore a repeated description of the same components can be dispensed with.

As may be seen in particular from FIG. 4, the disk-shaped section 38 of the adjusting element 36 has, on an end side 47 facing toward the reaction element 6, groove-shaped or notch-shaped recesses 48 for rotationally locking the adjusting element 36. Here, for example four recesses 48 are provided which are arranged so as to be distributed uniformly on the end side 47. The recesses 48 prevent a rotation of the adjusting element 36 after the above-described adjustment of the output effective area A2, since the pressure which is generated in the reaction element 6 during the actuation of the brake servo causes the material of the reaction element 6 to flow into the recesses 48 and thereby lock the adjusting element 36. The required torque for rotating the adjusting element 36 therefore increases with an increase of the pressure in the reaction element 6.

The recesses 48 are designed such that a rotation of the adjusting element 36 is still possible during the described adjusting process. The design of the recesses 48 as grooves or notches is not strictly necessary here. It is likewise conceivable for a roughened surface to be provided on the end side 47.

Furthermore, it is also possible within the context of the invention to provide the rotational locking arrangement in the form of a locking thread, either on the threaded bore 34 of the output element or on the threaded section 37 of the adjusting element 36.

The exemplary embodiments described below differ from the first two exemplary embodiments in the configuration of the output member 14, such that only the output member 14 is described in each case. The other components are substantially identical and are therefore provided with the same reference symbols. For a description, reference is made to the first two exemplary embodiments.

Figure 5:
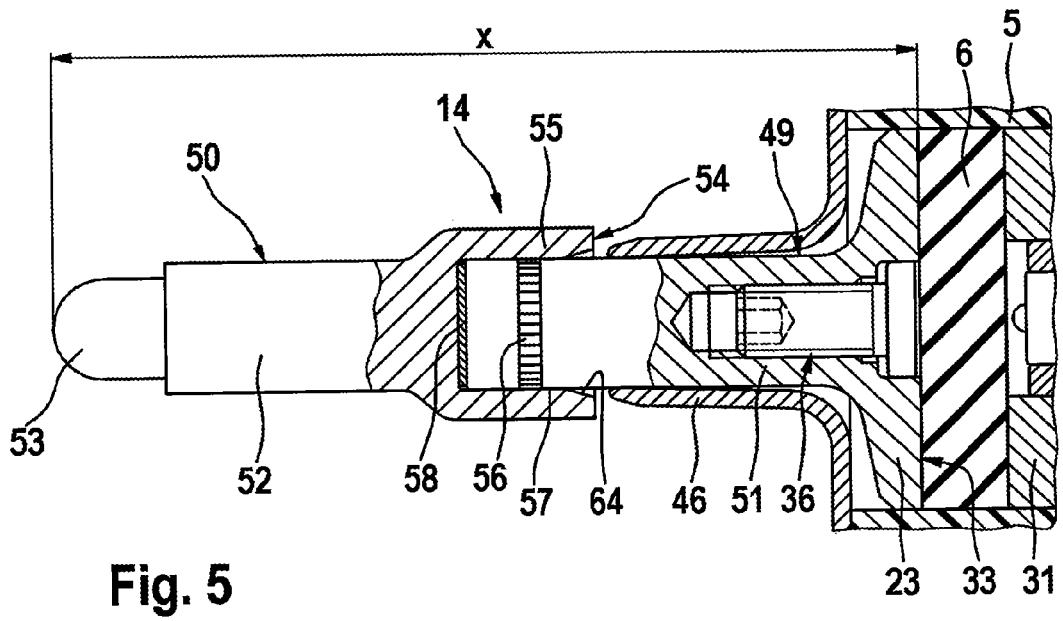
FIG. 5 shows a detail of a third exemplary embodiment of a brake servo according to aspects of the invention, in longitudinal section.

FIG. 5 shows a detail of a third exemplary embodiment of a brake servo according to aspects of the invention, in longitudinal section. As can be seen, the output member 14 is formed in two parts with a first and a second component 49, 50.

The first component 49 has the head flange 23 as described further above, and a cylindrical section 51 which adjoins said head flange 23. Furthermore, the second component 50 of the output member 14 has a second cylindrical section 52 with a first, spherical end 53, which faces away from the first component 49, and a second end 54 with a pot-shaped section 55.

As can be seen from FIG. 5, the first cylindrical section 51 has a knurl 56 on its outer side 57, by means of which knurl 56 the cylindrical sections 51,52 of the two components 49,50 can be captively connected to one another.

To facilitate assembly, the pot-shaped recess 55 has an insertion bevel 64 on its inner side.

Furthermore, to adjust a so-called functional dimension x of the brake servo, it is possible for one or more spacer disks 58 to be inserted between the two components 49, 50.

Figure 6:
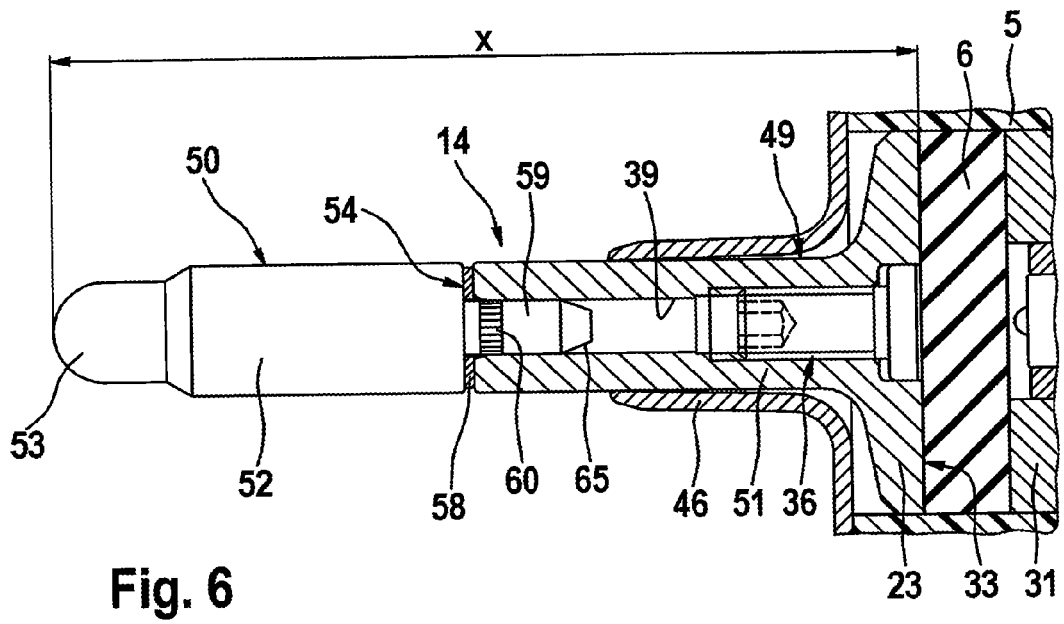
FIG. 6 shows a detail of a fourth exemplary embodiment of a brake servo according to aspects of the invention, in longitudinal section.

FIG. 6 shows a detail of a fourth exemplary embodiment of a brake servo according to aspects of the invention, in longitudinal section. Said fourth exemplary embodiment differs from the third exemplary embodiment as per FIG. 5 in that the second component 50 has, at its second end 54, a journal 59 with a knurl 60 which, for the captive connection to the first component 49, projects into a passage bore 39. To facilitate assembly, an insertion bevel 65 is provided on the journal 59.

Figure 7:
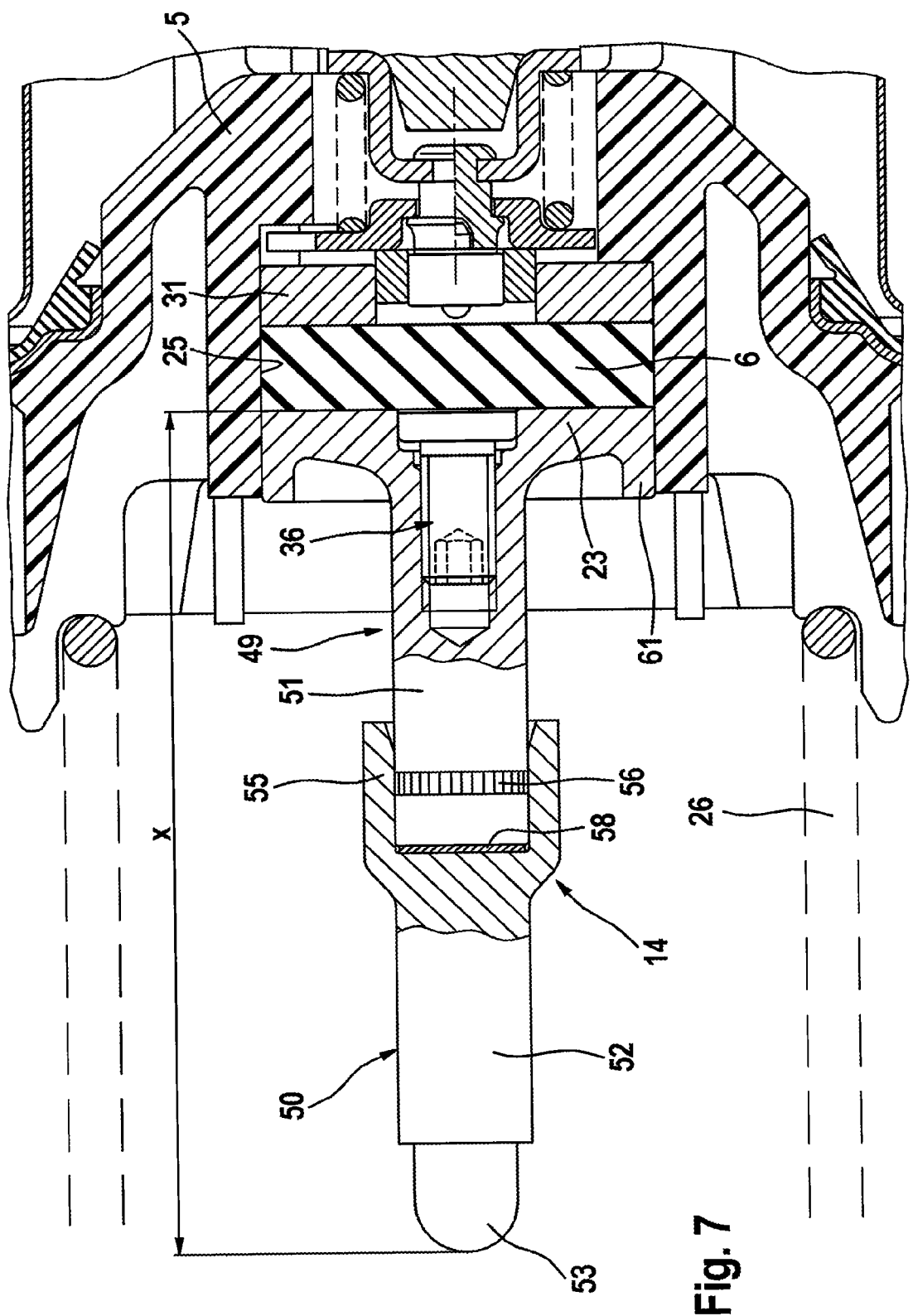
FIG. 7 shows a detail of a fifth exemplary embodiment of a brake servo according to aspects of the invention, in longitudinal section.

FIG. 7 shows a detail of a fifth exemplary embodiment of a brake servo according to aspects of the invention, in longitudinal section. Said fifth exemplary embodiment differs from the third exemplary embodiment as per FIG. 5 in that the head flange 23 has, at the periphery, an encircling collar 61 for guiding the output member 14 in the control housing recess 25. The guide plate 46 can thereby be dispensed with, and the restoring spring 26 bears directly against the control housing 5.

Figure 8:
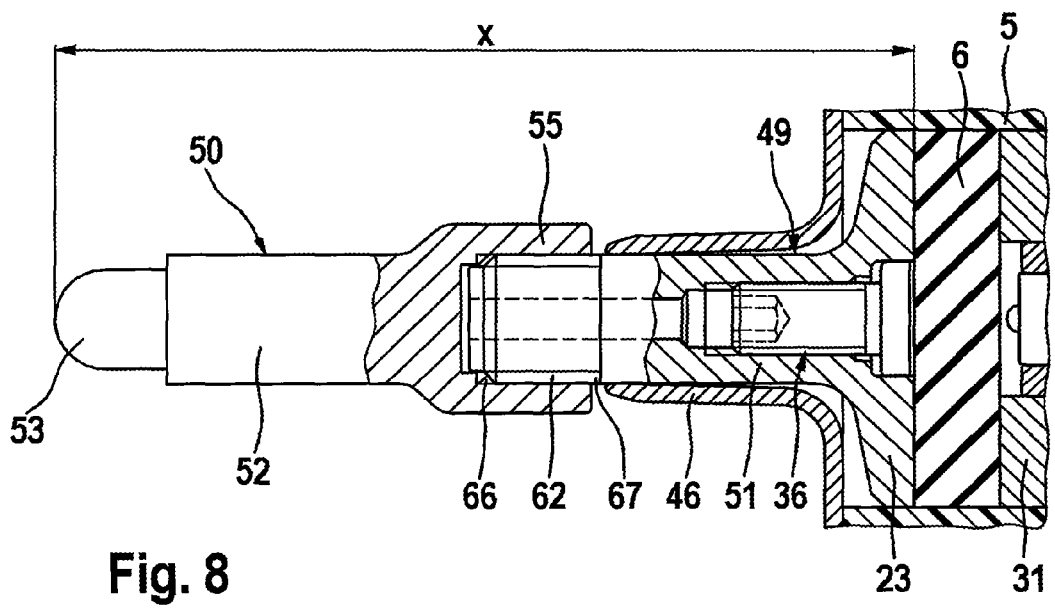
FIG. 8 shows a detail of a sixth exemplary embodiment of a brake servo according to aspects of the invention, in longitudinal section.

FIG. 8 shows a detail of a sixth exemplary embodiment of a brake servo according to aspects of the invention, in longitudinal section. Said sixth exemplary embodiment differs from the third exemplary embodiment as per FIG. 5 in that the captive connection is provided by means of a threaded connection 62 between the first component 49 and the second component 50. For this purpose, the pot-shaped section 55 has an internal thread 66 and the first cylindrical section 51 of the first component 49 has an external thread 67.

Figure 9:
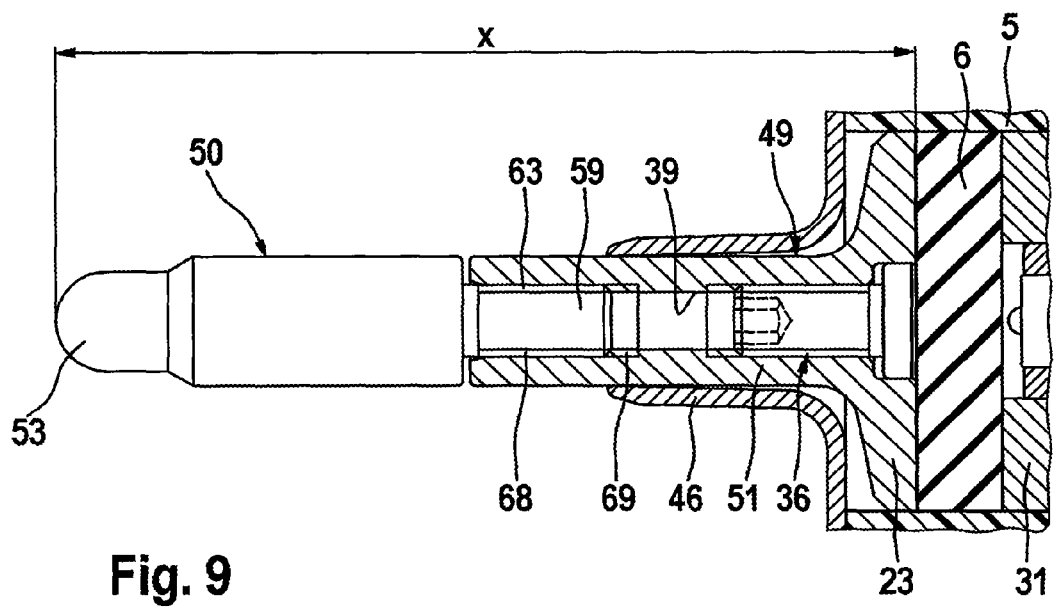
FIG. 9 shows a detail of a seventh exemplary embodiment of a brake servo according to aspects of the invention, in longitudinal section.

FIG. 9 shows a detail of a seventh exemplary embodiment of a brake servo according to aspects of the invention, in longitudinal section. Said seventh exemplary embodiment differs from the fourth exemplary embodiment as per FIG. 6 in that the captive connection is provided by means of a threaded connection 63 between the first component 49 and the second component 50.

As can be seen, for this purpose, the journal 59 is provided with an external thread 68, and the passage bore 39 has an internal thread 69.

In the latter two exemplary embodiments, the adjustment of the functional dimension can either take place by means of spacer disks between the two components 49, 50 or can be realized by means of the threaded connection 62, 63. Here, the threaded connections 62, 63 should be of self-locking design, or the threaded connections 62, 63 must be calked.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A pneumatic brake servo comprising:
a servo housing divided into at least one working chamber and at least one vacuum chamber by at least one axially movable wall, wherein the axially movable wall is actuable by a pneumatic differential pressure;
an actuable input member including a valve piston;
a control valve arranged in a control housing, wherein the control valve is actuable by the valve piston for controlling the pneumatic differential pressure;
an elastic reaction element arranged in a recess of the control housing;
an output member positioned to bear on the elastic reaction element and act on a master brake cylinder with an output force, wherein the actuable input member acts on the elastic reaction element with an input effective area (A1) and the output member acts on the elastic reaction element with an output effective area (A2) and the ratio of output effective area (A2) to input effective area (A1) determines a force boost ratio of the brake servo; and
means for manually adjusting the output effective area (A2),
wherein the means for manually adjusting the output effective area is an adjusting element including a disk-shaped section, with the disk-shaped section of the adjusting element being arranged so as to be guided in a recess of the output member that faces the reaction element and having a diameter (D1).

2. The brake servo as claimed in claim 1, wherein the adjusting element is formed in one part.

3. The brake servo as claimed in claim 1, wherein the adjusting element comprises at least two parts including a disk that incorporates the disk-shaped section and a set screw that incorporates a threaded section.

4. The brake servo as claimed in claim 1, wherein the diameter (D1) of the recess of the output member is greater than a diameter (D2) of a threaded bore of the output member.

5. The brake servo as claimed in claim 1, wherein a head flange of the output member is positioned to bear on the elastic member.

6. The brake servo as claimed in claim 5, wherein the output member comprises a first component and a second component, with the first component incorporating the head flange and a first section adjoining said head flange, wherein the first section of the first component and the second component of the output member is configured to be captively connected to one another.

7. The brake servo as claimed in claim 6, wherein the second component of the output member includes a spherical end that faces away from the first component.

8. The brake servo as claimed in claim 6, wherein the first section and a second section of the output member are cylindrical.

9. The brake servo as claimed in claim 6, wherein the second component has a pot-shaped section for captive connection to the first component.

10. The brake servo as claimed in claim 6, wherein the second component has a journal which projects into a passage bore for captive connection to the first component.

11. The brake servo as claimed in claim 6, wherein the captive connection is provided by means of a knurl on the first component or on the second component.

12. The brake servo as claimed in claim 6, wherein the captive connection is provided by means of a threaded connection between the first component and the second component.

13. The brake servo as claimed in claim 6, wherein a circumference of the head flange has an encircling collar for guiding the output member in the recess of the control housing.

14. The brake servo as claimed in claim 6, wherein spacer disks are configured to be inserted between the first and the second component to adjust a functional dimension (x) of the brake servo.

15. The pneumatic brake servo as claimed in claim 1, the means for manually adjusting the output effective area A2 is configured to adjust the output effective area when the brake servo is in an assembled state.

16. A pneumatic brake servo comprising:
a servo housing divided into at least one working chamber and at least one vacuum chamber by at least one axially movable wall, wherein the axially movable wall is actuable by a pneumatic differential pressure;
an actuable input member including a valve piston;
a control valve arranged in a control housing, wherein the control valve is actuable by the valve piston for controlling the pneumatic differential pressure;
an elastic reaction element arranged in a recess of the control housing;
an output member positioned to bear on the elastic reaction element and act on a master brake cylinder with an output force, wherein the actuable input member acts on the elastic reaction element with an input effective area (A1) and the output member acts on the elastic reaction element with an output effective area (A2) and the ratio of output effective area (A2) to input effective area (A1) determines a force boost ratio of the brake servo; and
means for adjusting the output effective area (A2),
wherein the means for adjusting the output effective area is an adjusting element including a disk-shaped section, with the disk-shaped section of the adjusting element being arranged so as to be guided in a recess of the output member that faces the reaction element and having a diameter (D1),
wherein the adjusting element includes a threaded section and the output member includes a threaded bore facing the reaction element and into which the threaded section of the adjusting element is screwed.

17. The brake servo as claimed in claim 16, wherein the output member has a passage bore which opens out into the threaded bore and through which an adjusting tool for rotating the adjusting element is provided access.

18. The brake servo as claimed in claim 16 further comprising means for rotationally locking the adjusting element.

19. The brake servo as claimed in claim 18, wherein the means for rotationally locking the adjusting element are provided on the threaded bore of the output member.

20. The brake servo as claimed in claim 18, wherein the means for rotationally locking the adjusting element are provided on the threaded section of the adjusting element.

21. The brake servo as claimed in claim 18, wherein the adjusting element has a roughened surface on an end side facing toward the reaction element.

22. The brake servo as claimed in claim 18, wherein the adjusting element has recesses on an end side facing toward the reaction member.

23. The brake servo as claimed in claim 22, wherein the recesses are grooves and are arranged so as to be distributed uniformly on the end side.

24. A pneumatic brake servo comprising:
an elastic reaction element;
an actuable input member positioned to bear on a surface of the elastic reaction element, wherein the actuable input member acts on the elastic reaction element with an input effective area (A1);
an output member positioned to bear on an opposite surface of the elastic reaction element and being configured to act on a master brake cylinder with an output force, wherein the output member acts on the elastic reaction element with an output effective area (A2); and
means for manually adjusting the output effective area (A2) to change a force boost ratio of the pneumatic brake servo,
wherein the means for manually adjusting the output effective area is an adjusting element including a disk-shaped section, with the disk-shaped section of the adjusting element being arranged so as to be guided in a recess of the output member that faces the reaction element and having a diameter (D1).

* * * * *

UNITED STATES PATENT AND TRADEMARK OFFICE
CERTIFICATE OF CORRECTION

PATENT NO.        : 8,671,823 B2                                                    Page 1 of 1
APPLICATION NO.   : 12/297266
DATED             : March 18, 2014
INVENTOR(S)       : Faller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1323 days.

Signed and Sealed this
Twenty-ninth Day of September, 2015

Michelle K. Lee
*Director of the United States Patent and Trademark Office*